Patented Jan. 8, 1946

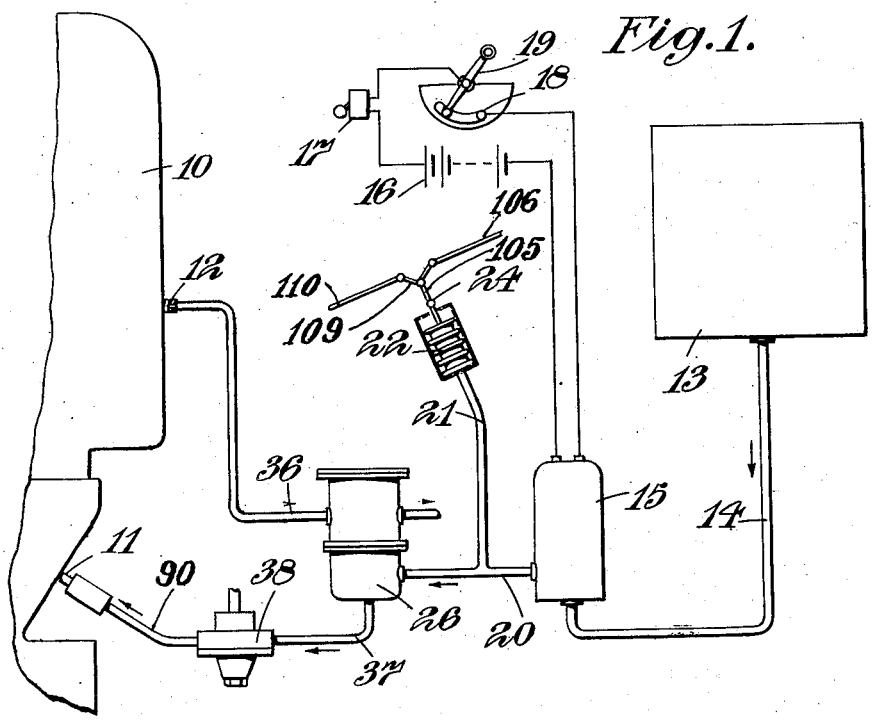
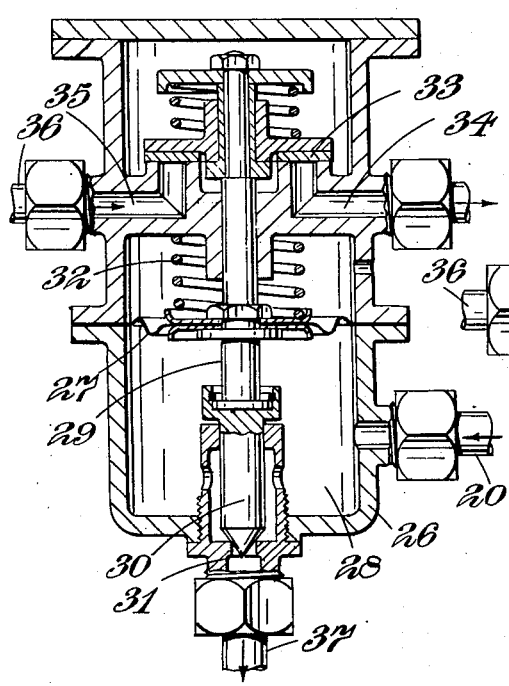
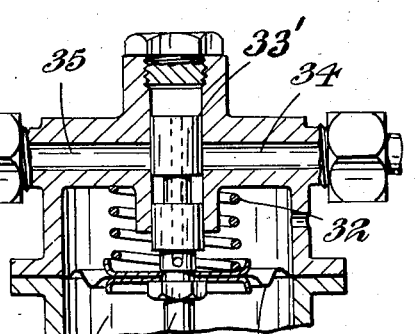

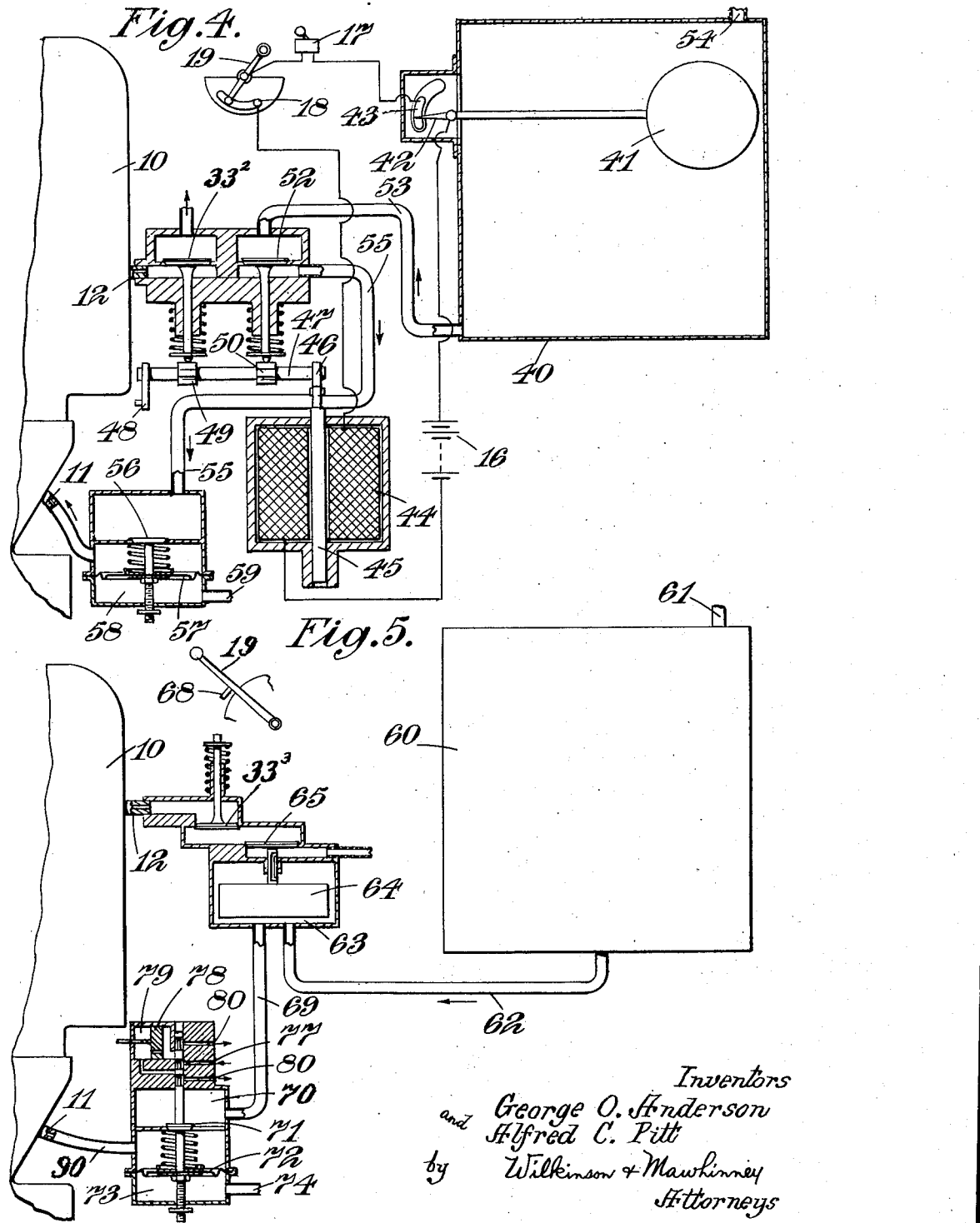

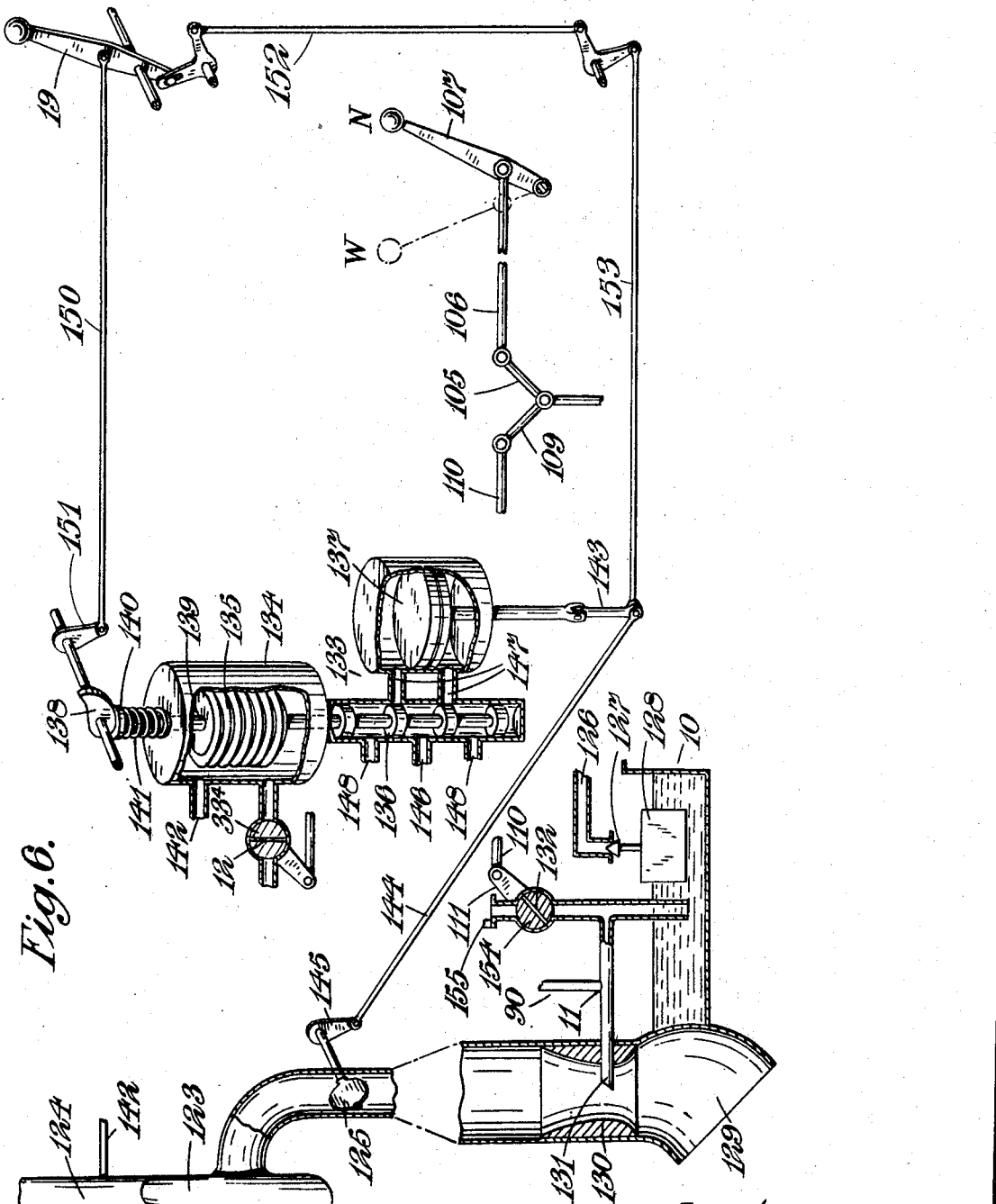

2,392,565

UNITED STATES PATENT OFFICE 2,392,565

SUPERCHARGED INTERNAL-COMBUSTION ENGINE

George Oswald Anderson and Alfred Cyril Pitt, Bristol, England, assignors to The Bristol Aeroplane Company Limited, Bristol, England, a British company Application February 8, 1943, Serial No. 475,146
In Great Britain July 23, 1941

17 Claims. (Cl. 123—198)

The present invention concerns improvements in or relating to supercharged internal-combustion engines and is of particular advantage for use in connection with aircraft engines although not limited thereto. The invention, however, will be described with reference to aircraft engines.

At the higher pressures of supercharge which are used in such engines (for example during take-off and all-out level flight) there is a tendency to detonation even though additional fuel is passed to the engine to act as an internal cylinder coolant. Supplying an anti-detonant to the engine not only cures this tendency but enables supercharge-pressures to be employed which are substantially in excess of the maximum permissible without the anti-detonant, and enables a reduction of some 15 to 20% of the normal fuel consumption to be made. Although these advantages may be obtained over the whole range of operation of the engine by the continuous supply of an anti-detonant, nevertheless it is normal to restrict the use of the anti-detonant to periods of short duration when the higher supercharge pressures exist; consequently only a limited supply is carried in the aircraft. When this limited supply has become exhausted it is essential to ensure that the conditions of excess supercharge pressure and weakened fuel-mixture referred to cannot be brought about.

It is the object of the present invention to provide a simple apparatus for effecting a supply of anti-detonant, and automatically fulfilling the other requisite conditions specified.

The invention also includes various constructions and arrangements of apparatus as hereinafter described with reference to the accompanying drawings; in these drawings which are purely diagrammatic and not to scale:

Figure 1 is a diagrammatic lay-out of one apparatus in accordance with the invention in which the supply of anti-detonant is effected by a submerged centrifugal pump, Figure 2 is a sectional view of a detail of Figure 1, Figure 3 is a part sectional view of a construction alternative to Figure 2, Figure 4 is a diagrammatic lay-out of an apparatus in which the anti-detonant is supplied under pressure from its storage tank with an electro-magnetic control, Figure 5 is a lay-out of yet another apparatus in which the anti-detonant supply is effected under pressure from its storage tank under the control of mechanical devices, and Figure 6 is a diagrammatic lay-out of a part of the induction system of a supercharged internal-combustion engine and of an automatic control device for regulating the pressure of supercharge.

Referring first of all to Figure 6, the supercharger is indicated at 123 and delivers by a pipe 124 to the cylinders of the internal-combustion engine. A throttle valve 125 is provided which regulates the admission of the induction gases to the super-charger and hence the amount of the supercharge pressure. Associated with the suction side of the supercharger is a carburetter generally indicated by the reference numeral 10, the carburetter receiving fuel from a pipe 126 having an associated needle valve 127 which is operated in known manner by a float 128. Air is drawn into an intake 129 by the supercharger and passes through a venturi 130, thereby creating a pressure reduction in the jet pipe 131. The fuel is therefore drawn from the carburetter into the jet pipe and mixing with the air in the venturi, passes towards the inlet of the supercharger.

With a view to varying the datum setting of the fuel-air mixture, a valve 154 is provided, the valve having a calibrated orifice 132 which is capable of placing the jet pipe 131 in communication with the atmosphere. When this is done by adjustment of arm 111 the suction head of the venturi is diminished and as a consequence less fuel is drawn from the carburetter into the pipe 131. The fuel-air mixture is therefore weakened. When the valve 154 is in the position shown in Figure 6 the suction effect is therefore considered to be normal. Valve 154 is adjusted to the normal or weak fuel-mixture setting by lever 107 which is connected with arm 111 by links 110, 109, 105 and 106 as hereinafter explained. When lever 107 assumes the position indicated at N valve 154 assumes the position for normal fuel-air mixture and when at W valve 154 assumes the position for weak- fuel-air mixture.

Associated with the supercharger 123 is a known form of control for automatically regulating the pressure of supercharge. The control is generally indicated by the reference numeral 133 and comprises a chamber 134, a capsule-stack 135 mounted therein, a valve 136 carried by the stack of capsules, a hydraulic motor 137, the pressure fluid to which is regulated by the valve 136 and a cam 138 which engages with a rod 139 secured to the upper end of the stack of capsules. The rod 139 is formed with a collar 140 between which and the chamber 134 is placed a compression spring 141. The chamber 134 communicates with the delivery side of the supercharger 123 by a pipe 142 so that the pressure of supercharge is communicated to the stack of capsules 135. Accordingly with variations in the pressure of supercharge the stack of capsules 135 will expand or contract, thereby adjusting the valve 136 and permitting pressure fluid to pass to the hydraulic motor 137 so that the latter will adjust the valve 125 through linkage 143, 144 and 145. Pressure fluid is delivered to valve 136 by pipe 146 and is capable of passing to the motor 137 by passages 147, the exhaust fluid from the motor being discharged from pipes 148.

The cam 138 and the throttle valve 125 are each simultaneously capable of adjustment by the throttle-lever 19.

The operation of the supercharger control described above is as follows: When the pilot adjusts the throttle-lever 19 to select a particular power output from the internal-combustion engine, he simultaneously adjusts the datum cam 138 by linkage 150, 151 and the throttle-valve 125 through linkage 152, 153, 144, 145. When the throttle-valve 125 is thus adjusted the quantity of combustion mixture which passes to the supercharger 123 is varied and as a result the pressure of supercharge and the power output of the internal-combustion engine are correspondingly varied. When the datum cam 138 is thus adjusted, rod 139, the capsule stack 135 and valve 136 are moved axially as a unit so that valve 136 is opened. However when the newly established pressure of supercharge is transmitted by pipe 142 to the stack of capsules 135, valve 136 is readjusted and moved to the closed position when the pressure of supercharge has the correct value selected by adjustment of lever 19. This datum value of the supercharge pressure is determined by the cam 138 which is adjusted by the pilot for each power output selected. In the event that the pressure of supercharge departs from the value selected by the pilot, the automatic control device is brought into operation as described to adjust the throttle-valve 125 and re-establish the pressure of supercharge at the selected datum value.

Under certain circumstances it is desirable to obtain excess power output from the engine and for this purpose there is provided a valve diagrammatically illustrated at 33 which is capable of placing the chamber 134 in communication with the atmosphere by a calibrated orifice 12. When this is done the pressure of supercharge within the chamber 134 is reduced and as a result the stack of capsules 137 will expand, thereby moving the valve 136 to bring the motor 137 into operation to adjust the throttle-valve 125 and move it towards the open position. The pressure of supercharge and the power output of the engine are therefore increased. The valves 334 and 154 are operated in a manner hereinafter described.

The mechanism shown in Figure 6 which is provided to regulate the supercharge pressure and to vary the fuel-air mixture ratio is of known construction and operation. There is associated with this mechanism the apparatus shown in Figures 1 and 2, of Figures 1 and 3 or Figure 4 or 5 in order to regulate the admission of a supply of anti-detonant to the induction system of the engine.

Referring to Figures 1 and 2, the supply of anti-detonant is carried in a tank 13 from which it passes by a pipe 14 to an electrically driven centrifugal pump 15 which is situated at a lower level than the tank 13 so that if any liquid is present the pump is submerged, and generates a delivery-pressure when operated, but if no liquid is present no pressure is generated even when the pump is set in operation.

The electric motor driving the pump 15 is supplied from a battry 16 under the control of a master-switch 17 and a throttle-controlled switch 18. This throttle-controlled switch may be constituted by the throttle-lever 19 and so arranged that it is closed when the lever is moved beyond its normal working range to a "maximum supercharge pressure position" which is used only for take-off, all-out level speed or some such special condition. It will be appreciated that the switch is not necessarily mounted on the throttle-lever itself but may be connected to it or constituted by any member which moves with the throttle-lever, and in this specification the words "throttle-lever" are intended to include such parts.

The delivery from the centrifugal pump 15 is taken by a pipe 20 to which a branch connection 21 is made, and this pipe 21 communicates with a flexible capsule 22 which expands when subjected to pressure. The free end of the capsule is connected to rod 24 and through links 109, 110, 111 (see Figure 6) to the fuel-mixture-control-valve 154 so as to weaken the fuel-mixture when the capsule 22 is expanded. The fuel-mixture-control-lever 107 is connected by a linkage 106, 105, 109, 110 with the valve, 154 as described above, the links 105, 109 forming a pair of toggle-links. This construction is known in itself. In this way the pressure generated by the pump 15 in the delivery of anti-detonant effects adjustment of the fuel-mixture-control-valve 154 to the weak setting, if lever 107 has previously adjusted the valve for normal mixture setting.

The delivery-pipe 20 for the anti-detonant communicates with a valve assemblage in a casing 26, this valve assemblage being illustrated in section in Figure 2. It comprises a casing 26 having a flexible diaphragm 27 constituting one wall of a chamber 28 with which the pipe 20 communicates. Upon the flexible diaphragm there is mounted a spindle 29 carrying a needle-valve 30 which normally closes an outlet 31 for the anti-detonant but which opens it when the diaphragm is moved by the pressure of the liquid supplied to the chamber 28. A controlling spring 32 may be provided to load the diaphragm 27 in the direction of closing the valve 30. The spindle 29 carries at its upper end the valve 33 which is spring-pressed downwards on to a seating so as normally to shut off communication between two passages 34, 35, but to open such communication when the diaphragm is moved by the pressure-supply to the chamber 28.

The passage 35 is connected by the pipe 36 to the calibrated orifice 12 which in this case is provided remotely of valve 33 and the passage 34 is open to atmosphere or to any other point at a suitably low pressure.

The outlet 31 for the anti-detonant is connected by a pipe 37 with a pressure-reducing valve 38 and thence by pipe 90 (Figure 6) to the inlet 11 for the anti-detonant to the induction system of the engine.

Figure 3 illustrates a modified construction of the valve 33' which controls communication between the passages 34 and 35; the general construction is similar to that of Figure 2 and the same reference characters are applied to it, the only difference being that instead of the disc-valve 33, a piston-valve 33' is used.

In the operation of this device, the master-switch 17 is first closed. When the throttle-lever 19 is moved to the position corresponding to maximum supercharge pressure for take-off, it closes a circuit by the switch 18 for the motor which thereupon sets the pump 15 in operation. If the pump is submerged the anti-detonant is delivered under pressure from the outlet 20 and such pressure is applied to the capsule 22 to adjust valve 154 to weaken the fuel-mixture as above-described, and is also applied to the diaphragm 27. The consequent movement of the diaphragm opens the valve 33' thereby placing chamber 134 in communication with the atmosphere through calibrating orifice 12 the effect being to reduce the pressure therein and automatically effect an increase in the supercharge pressure as described above. Also, the movement of the diaphragm opens the valve 30 and permits delivery of anti-detonant through the pipe 37 to the reducing-valve 38 and thence by the inlet 11 to the induction system of the engine. The reduction valve 38 is used, because it is desirable to have a high pressure, say for example 10 lbs. per square inch, to operate on the capsule 22 and diaphragm 27 but a pressure of, say, 2 lbs. is sufficient for the injection of the anti-detonant at the inlet 11.

It will further be appreciated that if the mixture-control-lever 107 is already in the weak position W, the mixture-control-valve 154 is up against a stop 155 (Figure 6) and cannot move further so that the toggle linkage 105, 109 cannot operate to further weaken the mixture. If, however, the control-lever 107 is in the normal position N then the toggle-linkage is operative to move the valve 154, 150 to the weak-mixture setting.

When the throttle-lever 19 is moved from the maximum supercharge pressure position to a position corresponding to a lower supercharge pressure, the circuit of the motor is broken at the switch 18 and the pump ceases to operate so that all the parts return to their normal position so that the supercharge pressure and the mixture strength then prevailing are those for which the mixture-lever and throttle-lever, i. e. the cockpit controls, are set.

If there is no supply of anti-detonant available in the tank 13, or if it becomes exhausted, the pump 15 will no longer be submerged so that no pressure is developed in the delivery-pipe 20 and the capsule 22 and diaphragm 27 remain unaffected or return to their original setting.

In the arrangement illustrated in Figure 4 the carburettor 10, anti-detonant connection 11 and calibrated orifice 12 are the same as in Figure 1, as is the master-switch 17, control-switch 18 and throttle-lever or associated part 19.

The tank 40 for the anti-detonant supply is provided with a float 41 controlling a switch-arm 42 which sweeps over a contact 43 in the electric circuit controlled by the switches 17 and 18, the arrangement being such that when the tank is empty the circuit is interrupted at the contacts 42, 43, but so long as there is an available supply of anti-detonant the circuit remains closed at these contacts. The electric circuit is used to energise a solenoid 44 when the switch 18, 19 is closed, and the armature 45 of the solenoid is coupled to an arm 46 on a rocking-shaft 47. This shaft carries an arm 48 which is coupled to the junction of toggle-links 105, 109 so as to adjust the fuel-mixture-control-valve to the weak setting when the shaft is rocked, the arrangement being, for example, similar to that illustrated as the toggle-linkage in Figure 1. The shaft 47 also carries two cams 49, 50 which, on rocking of the shaft, open valves 33², 52, respectively. The valve 33² normally closes the outlet from the calibrated orifice 12 which effects the boost-control, and the valve 52 controls the delivery of anti-detonant from the tank 40 by the pipe-connection 53. The tank 40 is maintained under pressure in any convenient manner; it may, for example, be connected by the pipe 54 to the delivery side of a vacuum pump normally used on aircraft, or to any other source of pressure so that when the valve 52 is opened an outlet path for the anti-detonant is provided to the pipe-connection 55.

Whilst the pipe 55 might be connected directly to the anti-detonant inlet 11, it is preferred to provide an additional control for its delivery by a valve 56. This valve is operated by a flexible diaphragm 57 in a chamber 58 which is subjected to the supercharge-pressure in the induction system by a pipe-connection 59, so that no delivery of anti-detonant takes place until the higher boost-pressure has been effected.

In the operation of this device the master-switch 17 is first closed, and if there is a supply of anti-detonant available the electric circuit is closed at the contacts 42, 43. When the throttle-lever 19 is moved to the maximum-supercharge pressure position it closes the electric circuit at 18 and energises the solenoid 44. If no anti-detonant is available in the tank the circuit of the solenoid is opened at the contacts 42, 43 so that it is not energised and nothing happens.

When the solenoid is energised it rocks the shaft 47 and opens the valve 33², thereby opening orifice 12 so as to cause the supercharge-pressure in the induction system of the engine to be increased. Simultaneously the shaft 47 opens the valve 52 to permit the supply of anti-detonant under pressure from the tank 40, and as soon as the higher supercharge-pressure has been established it operates on the diaphragm 57 in the chamber 58 to open the valve 56 and allow the anti-detonant to pass along pipe 90 and in at 11 to the induction system.

In the arrangement illustrated diagrammatically in Figure 5, the carburettor is indicated at 10 with the anti-detonant inlet at 11 and the calibrated-orifice at 12 as in the previous figures. The anti-detonant is stored in a tank 60 on which pressure is maintained by the pipe-connection 61 in any convenient manner, and the delivery takes place therefrom by the pipe 62. The pipe 62 communicates with a chamber 63 situated near the level of the bottom of the tank 60 and containing a float 64 which rises or falls according as anti-detonant is available or not available from the tank. This float 64 controls a valve 65, opening it when the float rises and closing it when the float falls, and a valve 65 is in series with a second valve 33³ so that the two of them jointly control the connection of orifice 12 to the atmosphere.

The valve 33³ is normally held closed but arranged to be opened by movement of the throttle-lever 19 to its maximum supercharge pressure position. This is indicated diagrammatically by a finger 68 upon the lever directly engaging the valve to open it, but obviously any suitable mechanical connection can be used.

The chamber 63 which receives anti-detonant from the tank 60 delivers it by a pipe-connection 69 to a chamber 70 from which it passes under the control of a valve 71, this valve being operated by a flexible diaphragm 72 constituting the wall of a chamber 73 which is in connection with the induction system by a pipe-connection 74 so as to be subjected to the boost-pressure existing in the system. When the valve 71 is open the anti-detonant passes downwards and out by the pipe-connection 90 by the inlet 11 to the induction system.

The diaphragm 72 which controls the valve 71 has its spindle extended upwards at 76 to constitute a piston-valve for a hydraulic relay device. Oil under pressure is admitted at an inlet 77 and by means of the relay valve is either shut off or admitted to one side or other of the relay piston 78 in a cylinder 79, the exhaust from the two ends of the cylinder being effected in the usual manner at the outlets 80. The piston 78 connects with the toggle-links 105, 109 shown in Figure 6 and therefore controls the fuel-mixture-control-valve in any convenient manner.

In the operation of this device, movement of the lever 67 to its limiting position opens the bleed-valve 33³. If a supply of anti-detonant is available the float 64 is in its upper position and the valve 65 is open so that the pressure in the chamber 134 is reduced and the supercharge-pressure in the induction system increased, as above described. This increased supercharge-pressure is transmitted to the chamber 73 so as to be operative on the diaphragm 72 to open the valve 71 and also operate the relay-valve. Anti-detonant is thereby admitted from the chamber 63 by the pipe 69, valve 71 and pipe 75 to the induction system of the engine and at the same time the relay piston 78 is operated in such a manner as to weaken the fuel-mixture.

If there is no supply of anti-detonant available, the float 64 is in its lowermost position and maintains the valve 65 closed. In this case there is no relief of pressure from the boost-capsule-control-chamber so that there is no increase in the boost-pressure and the diaphragm 72 therefore does not operate the valve 71 or relay valve so that no change in the working conditions of the engine takes place. Similarly, if the supply of anti-detonant is exhausted whilst the apparatus is in operation, the closing of the valve 65 renders the whole control inoperative and all the conditions are restored to normal.

In the foregoing description reference has been made to anti-detonants generally and for this purpose there may be used water, or a mixture of water and alcohol or a mixture of methanol and water, but it is to be understood that the invention is not restricted to the use of these anti-detonants.

We claim:

1. In a supercharged internal-combustion engine, the combination of means operable to supply anti-detonant thereto, means operated therewith effecting weakening of the fuel-mixture, means also operated therewith to increase the supercharge-pressure, said fuel-mixture-weakening means and said supercharge-pressure-increasing means being dependent on the presence of a supply of anti-detonant for their operation.

2. In a supercharged internal-combustion engine, the combination of manually-adjusted means controlling the power-output of the engine, means operated by the adjustment thereof to a predetermined setting to effect a supply of anti-detonant to the engine, means operated by the pressure of the anti-detonant supply to effect an increase in the supercharge-pressure beyond the normal value, and means also operated by the supply of anti-detonant to weaken the fuel-mixture.

3. In a supercharged internal-combustion engine, the combination of an automatic supercharge-control device controlling the power-output of the engine, means for adjusting said supercharge control device, means operable on a predetermined setting of the said adjusting means to override said automatic supercharge-controlling device, means operated by such setting to effect a supply of anti-detonant to the engine and means also operated by said setting to weaken the fuel-mixture.

4. In a supercharged internal-combustion engine, the combination of manually-adjusted means controlling the power output of the engine, an automatic supercharge-control device, means operable at a predetermined setting of said manually-adjusted means to adjust said supercharge-controlling device to provide a higher supercharge-pressure, means whereby said higher supercharge-pressure opens a valve, means for supplying anti-detonant by way of said valve to the engine and means whereby the fuel-mixture is weakened by the adjustment of said manual controlling means to said predetermined setting.

5. In a supercharged internal-combustion engine, the combination with an automatic supercharge-control device and the throttle-lever, of means operable by a predetermined setting of the throttle-lever, to initiate a supply under pressure of anti-detonant, means whereby the delivery pressure of anti-detonant effects an increase in the supercharge-pressure, and means whereby said delivery pressure also effects a weakening of the fuel-mixture.

6. A construction of the parts set forth in claim 1, comprising in combination a valve opened on a predetermined setting of the throttle-lever, a float valve in series with the throttle-valve and opened by the anti-detonant, means operable by the high boost pressure produced on opening the throttle and float valves to weaken the fuel-mixture and permit the anti-detonant to pass to the engine.

7. In a supercharged internal-combustion engine, the combination with an automatic supercharge control device and the throttle lever, of means operable by a predetermined setting of the throttle-lever to initiate a supply under pressure of anti-detonant, means whereby the delivered pressure of anti-detonant effects an increase in the supercharge pressure, and means whereby said delivery pressure also effects a weakening of the fuel mixture, the pressure supply of anti-detonant being effected by a centrifugal pump situated below the level of the available liquid, whereby pressure is generated only in the presence of the liquid.

8. A construction according to claim 7, wherein the pump is driven by an electric motor controlled by a switch that is closed by movement of the throttle-lever to a predetermined setting.

9. In a supercharged internal-combustion engine, the combination with an automatic supercharge control device and the throttle lever, of means operable by a predetermined setting of the throttle-lever to initiate a supply under pressure of anti-detonant, means whereby the delivery pressure of anti-detonant effects an increase in the supercharge pressure, and means whereby said delivery pressure also effects a weakening of the fuel mixture, the pressure supply of anti-detonant being effected by a centrifugal pump situated below the level of the available liquid, whereby pressure is generated only in the presence of the liquid, an expansible chamber in communication with the delivery side of the pump, an operative connection from the movable part of said chamber to the mixture control valve, a valve operable by the pump pressure to open a bleed valve from the supercharge control capsule chamber, a second valve operable by the pump pressure to admit anti-detonant to the induction system.

10. A construction according to claim 9, and comprising a pressure-reducing valve for the anti-detonant supply situated between the pressure-controlled admission valve and the induction system.

11. In a construction according to claim 9, a control-valve comprising a chamber having a flexible diaphragm wall, means for admitting anti-detonant under pressure to the chamber, a valve coupled to said diaphragm controlling a bleed from the boost-control-capsule-chamber, and a second valve also coupled to said diaphragm controlling an outlet from the chamber for the anti-detonant.

12. In a supercharged internal-combustion engine, the combination of means operable to supply anti-detonant thereto, means operated therewith effecting weakening of the fuel-mixture, means also operated therewith to increase the supercharge-pressure, said fuel-mixture-weakening means and said supercharge-pressure-increasing means being dependent on the presence of a supply of anti-detonant for their operation, a switch closed in a predetermined setting of the throttle lever, an anti-detonant supply tank having a float operated switch in series with the throttle switch, an electro-magnetic device energized by the closing of both said switches, means operated thereby to open a bleed valve from the pressure control capsule chamber, and to weaken the fuel mixture.

13. A construction according to claim 12, wherein the electro-magnetic device also operates means to open an anti-detonant supply-valve.

14. A construction according to claim 12, and comprising in addition means operated by the supercharge-pressure to open the valve or a second valve controlling the supply of anti-detonant.

15. A construction according to claim 12, wherein the anti-detonant is maintained under pressure in its supply tank.

16. In a supercharged internal-combustion engine, the combination of means operable to supply anti-detonant thereto, means operated therewith effecting weakening of the fuel-mixture, means also operated therewith to increase the supercharge-pressure, said fuel-mixture-weakening means and said supercharge-pressure-increasing means being dependent on the presence of a supply of anti-detonant for their operation, a valve opened on a predetermined setting of the throttle lever, a float valve in series with the throttle valve and opened by the anti-detonant, means operable by the high supercharge pressure produced on opening the throttle and float valves to weaken the fuel mixture and permit the anti-detonant to pass to the engine, a bleed valve from the supercharge control capsule chamber opened by movement of the throttle lever or an associated part to a predetermined setting, and a second valve in series therewith opened by a float in the anti-detonant supply.

17. A construction according to claim 16, comprising a chamber subjected to the supercharge-pressure and having a flexible diaphragm wall operatively connected to a hydraulic relay which operates a mixture-control valve, and to a valve admitting anti-detonant to the induction system.

GEORGE OSWALD ANDERSON.
ALFRED CYRIL PITT.